US006464049B2

(12) United States Patent
Lisenker

(10) Patent No.: US 6,464,049 B2
(45) Date of Patent: Oct. 15, 2002

(54) MAGNETORHEOLOGICAL FLUID DAMPER TUNABLE FOR SMOOTH TRANSITIONS

(75) Inventor: Ilya Lisenker, Miamisburg, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/918,917

(22) Filed: Jul. 31, 2001

(65) Prior Publication Data

US 2001/0050202 A1 Dec. 13, 2001

Related U.S. Application Data

(63) Continuation-in-part of application No. 09/772,640, filed on Jan. 30, 2001, now Pat. No. 6,318,520, which is a continuation-in-part of application No. 09/654,607, filed on Sep. 1, 2000, now Pat. No. 6,318,519
(60) Provisional application No. 60/153,505, filed on Sep. 13, 1999.

(51) Int. Cl.[7] .................................................. F16F 9/53
(52) U.S. Cl. ..................................... 188/267; 188/267.2
(58) Field of Search .............................. 188/267, 267.1, 188/267.2, 319.1, 322.2; 267/140.14, 140.15

(56) References Cited

U.S. PATENT DOCUMENTS

| 4,351,515 A | * | 9/1982 | Yoshida ................... 188/267.2 |
| 5,284,330 A | * | 2/1994 | Carlson et al. ......... 267/140.14 |
| 5,632,361 A | * | 5/1997 | Wulff et al. ............. 188/322.22 |
| 5,878,851 A | * | 3/1999 | Carlson et al. ......... 188/140.14 |
| 5,947,238 A | * | 9/1999 | Jolly et al. ................ 188/267.1 |
| 6,095,486 A | * | 8/2000 | Ivers et al. .................. 188/267 |
| 6,131,709 A | * | 10/2000 | Jolly et al. ................ 188/267.2 |
| 6,279,700 B1 | * | 8/2001 | Lisenker et al. .......... 188/267.1 |
| 6,318,519 B1 | * | 11/2001 | Kruckemeyer et al. ...... 188/267 |
| 6,318,520 B1 | * | 11/2001 | Lisenker et al. ............. 188/267 |
| 6,382,369 B1 | * | 3/2002 | Lisenker .................. 188/267.2 |
| 6,390,252 B1 | * | 5/2002 | Namuduri et al. ........ 188/267.2 |

* cited by examiner

Primary Examiner—Christopher P. Schwartz
(74) Attorney, Agent, or Firm—Scott A. McBain

(57) ABSTRACT

An improved magnetorheological fluid damper is provided which effectively provides a smooth transition, without a sharp break in the damper force/velocity curve, between very low damping forces near zero damper velocity to higher damping forces at higher piston velocities while maintaining desirable maximum force levels. The damper includes a piston assembly, including a magnet assembly and a flow gap extending through the piston assembly to permit fluid flow between the chambers. The force/velocity optimization feature includes at least one groove open to the flow gap, formed in a non-magnetic portion of the piston and positioned in series with a part of the flow gap in a magnetic circuit generated by the magnet assembly and dimensioned/sized to permit fluid flowing the passage to experience a magnetorheological effect less than a magnetorheological effect experienced by fluid flowing through the flow gap but not through the groove.

20 Claims, 4 Drawing Sheets

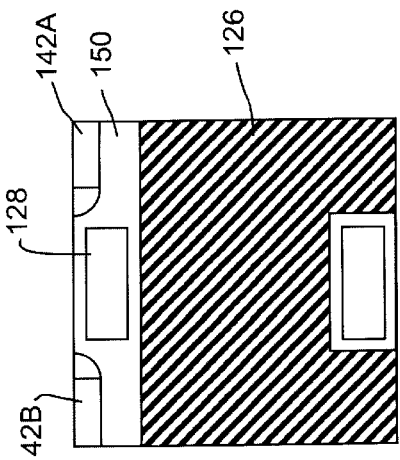
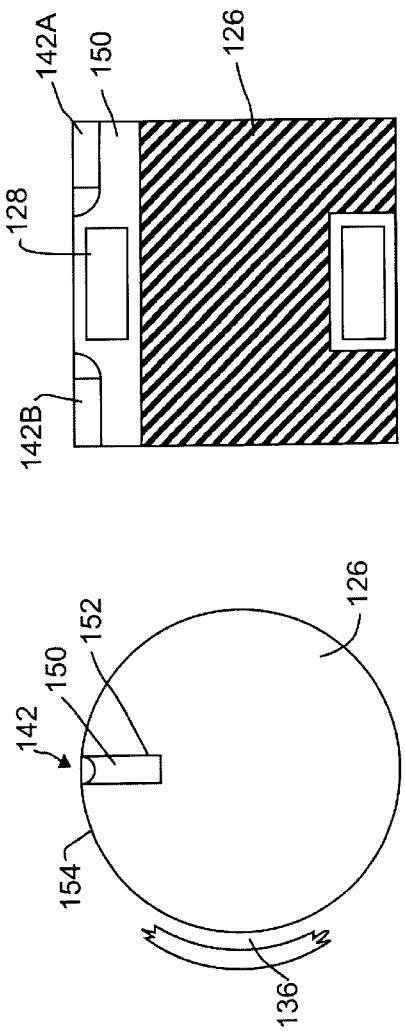
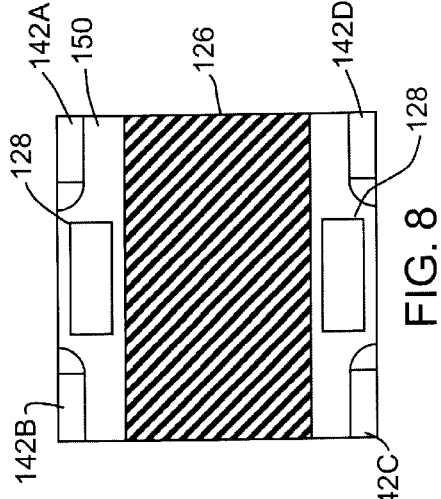
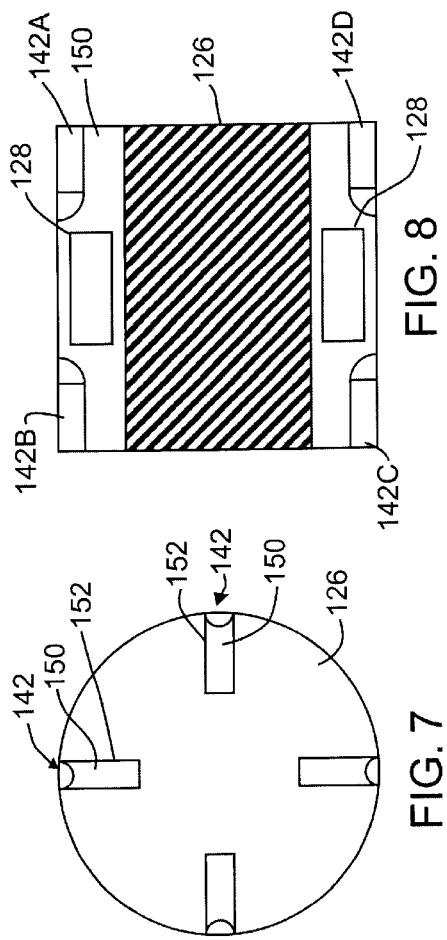

MAGNETORHEOLOGICAL FLUID DAMPER TUNABLE FOR SMOOTH TRANSITIONS

RELATED APPLICATIONS

This application is a continuation-in-part of U.S. application Ser. No. 09/772,640, filed Jan. 30, 2001, now U.S. Pat. No. 6,318,520, which is a continuation-in-part of U.S. application Ser. No. 09/654,607 filed on Sep. 1, 2000, now U.S. Pat. No. 6,318,519, which claims priority from U.S. Provisional Application Ser. No. 60/153,505 filed on Sep. 13, 1999, priority of which is claimed and the entire disclosures of which are incorporated herein by reference.

TECHNICAL FIELD

The present invention relates to a magnetorheological fluid damper and more particularly, to a linear acting fluid damper for a vehicle suspension employing magnetic tuning in connection with a magnetorheological working fluid to effect desired damping levels and further including a bypass feature.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electromagnetorheological interactive properties for advantageous use in a variety of controllable coupling and damping devices, such as brakes, clutches, and dampers.

Linear acting MR dampers have been previously proposed for suspension systems, such as a vehicle suspension system and vehicle engine mounts. One example of such a MR damper discloses a conventional linear acting controllable vibration damper apparatus that includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. When the piston is displaced, magnetorheological fluid is forced through the annular flow passage. When the coil is energized, a magnetic field permeates the channel and excites a transformation of the magnetorheological fluid to a state that exhibits increased damping forces as a result of an increase of apparent viscosity of the fluid.

The damping performance of a suspension damper is largely dependent on the force-velocity characteristics of the damper. In standard suspension dampers of the prior art that do not use MR fluid, the force-velocity curve typically has a steeper slope at low velocities and desirably passes through the zero point of damping force at zero velocity, thus producing a smooth transition between damper movements in compression and extension directions. Without special design considerations, however, a suspension damper using MR fluid tends to have a force-velocity curve that intersects the force axis at a value above zero from the positive velocity side and a value below zero from the negative velocity side, thus producing a jump in force between finite positive and negative values with each change in the direction of damper movement. These jumps in force tend to provide a harshness to the vehicle ride which may be felt by the vehicle occupants.

Conventional MR dampers attempt to solve the zero intersect problem by including one or more fluid bypass passages through the piston or on the outer surface thereof, in an area of weak or no magnetic flux and not open to the main, magnetic flux controlled fluid path through the piston, e.g., in the outer surface of the flux ring. The relatively unimpeded flow of MR fluid through the outer bypass passages permits the damping curves to intersect zero. However, this design also results in an undesirable steep rise in the damping curve from the zero point followed by a sharp transition into higher velocities. In addition, the steep rise may often result in the damper overshooting the desired force at the transition. The steep slope and overshooting results in undesirable discontinuities when such a damper is used in vehicle suspensions. Specifically, the use of a totally separate bypass passage impairs the ability to achieve noise control and smooth load transfer. Also, the MR fluid flowing through the outer bypass passages is not within the magnetic flux path, is not exposed to magnetic flux and therefore, does not experience an MR effect. As a result, the outer passages represent a pure loss in pressure in the system that disadvantageously reduces the maximum force achievable.

Therefore, there is a need for an MR damper capable of effectively providing a smooth and controllable transition, without a sharp break in the damper force/velocity curve, between very low damping forces near zero damper piston velocity to higher damping forces at higher damper piston velocities while maintaining desirable maximum force levels.

SUMMARY OF THE INVENTION

The present invention is aimed at providing an MR damper capable of effectively providing a smooth transition between very low damping forces near zero damper piston velocity to a higher damping forces at higher damper piston velocities without sacrificing maximum force levels.

One aspect of the present invention provides a damper, including a cylinder containing a magnetorheological fluid. A piston is slidably mounted for reciprocal movement in the cylinder. The piston includes a core and a flux ring positioned about the core, the core and flux ring defines an annular, axially directed flow gap therebetween and at least one non-magnetic portion is positioned along the flow gap in at least one of the flux ring and the core, wherein the non-magnetic portion includes at least one groove formed therein and positioned along at least a portion of the flow gap.

Other aspects of the present invention provides a coil disposed in the piston core, wherein the at least one groove can be an interrupted groove formed above and below the coil. The at least one groove can be a plurality of axial grooves arranged about one or both of the core and the flux ring. The plurality of grooves can be formed on an outer surface of the core. The plurality of grooves can be formed on an inner surface of the flux ring. The non-magnetic material can be a polymeric material. The non-magnetic portion can be disposed in at least one axial slot formed in the flux ring. The non-magnetic portion can be disposed in at least one axial slot formed in the core. The at least one groove can extend along an entire length of the flux ring in communication with the flow gap along an entire length of the groove.

Another aspect of the present invention provides a method for providing a smooth transition between low and high velocity damping forces in a fluid damper for a vehicle suspension including generating a predetermined flux level through a gap formed between a first and second chamber of the damper, wherein the gap comprises an annular, axially directed passage within a piston assembly of the damper and generating a decreased flux level through at least one groove, an entire length of the groove formed in communication with the gap, wherein the groove is formed in a non-magnetic portion of the piston and axially directed along at least a portion of a length of one of an inner wall and an outer wall defining the annular, axially directed passage.

Another aspect of the present invention provides a damper for providing a smooth transition between low and high velocity damping forces in a fluid damper for a vehicle suspension including a means for generating a predetermined flux level through a gap formed between a first and second chamber of the damper, wherein the gap comprises an annular, axially directed passage within a piston assembly of the damper and a means for generating a decreased flux level through at least one groove, an entire length of the groove formed in communication with the gap, wherein the groove is formed in a non-magnetic portion of the piston and axially directed along at least a portion of a length of one of an inner wall and an outer wall defining the annular, axially directed passage.

Another aspect of the present invention provides a damper, including a cylinder containing a magnetorheological fluid and a piston assembly slidably mounted for reciprocal movement in the cylinder to form a first chamber positioned on one side of the piston assembly and a second chamber positioned on an opposite side of the piston assembly. The piston assembly includes a fluid flow passage therethrough defining a flow gap. The flow gap permits limited fluid flow between the first chamber and the second chamber and includes a groove adjacent and open to the flow gap along at least a portion of the flow gap in the direction of fluid flow. The groove is formed in a portion of the piston assembly comprised of a non-magnetic material. The groove is axially directed along one of an inner wall and an outer wall defining the flow gap. The piston assembly further includes a magnet assembly establishing a magnetic flux circuit through the flow gap and through the groove in series with a region of the flow gap adjacent the groove. The magnetic flux is established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove and non magnetic portion of the piston causes the magnetic flux density therethrough to be smoothly reduced from that in the remainder of the flow gap.

Other aspects of the present invention provides a damper wherein the magnetic flux circuit including magnetic poles defining the flow gap, the flow gap and groove in series providing a greater gap width thereacross between the magnetic poles than the flow gap alone. The groove can be formed by a curvilinear surface. The curvilinear surface can be a circular arc. The groove can be formed by a triangular surface. The groove can be largely rectangular or trapezoidal in cross-section. The shape and size of the groove can be tuned to provide the desired force vs. velocity curve. The annular, axially directed passage could include a plurality of grooves formed therealong. The groove can be lined with a non-magnetic material adapted to lower the flux density in the groove.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 5 is a simplified end view of a piston of the present invention;

FIG. 6 is a cross-sectional view of the piston of FIG. 5;

FIG. 7 is a simplified end view of a piston of the present invention; and

FIG. 8 is a cross-sectional view of the piston of FIG. 7.

DESCRIPTION OF THE PREFERRED EMBODIMENT

Figure 1:
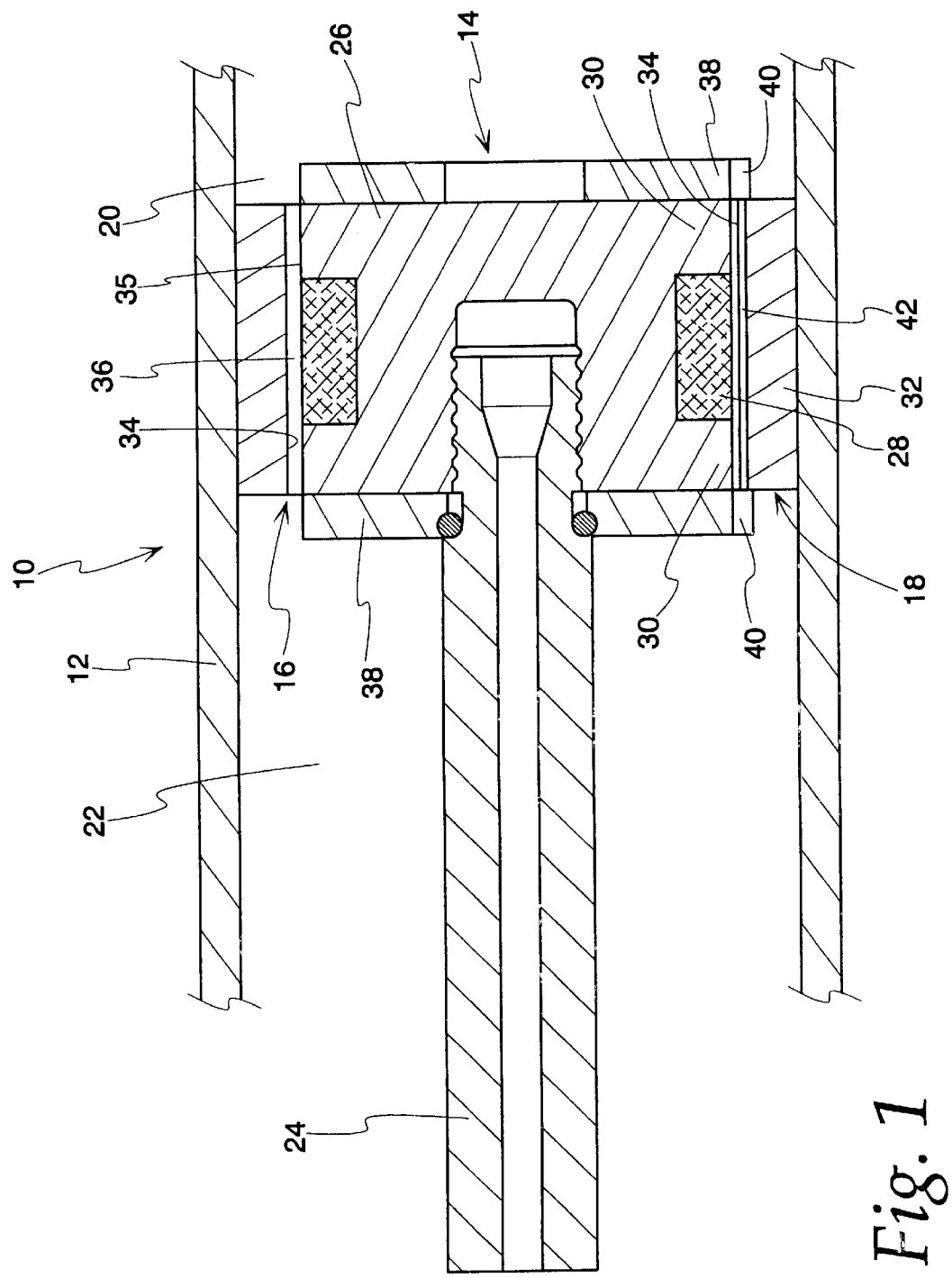
FIG. 1 is a sectional view of one embodiment of a portion of a magnetorheological damper in accordance with the present invention.

Referring to FIG. 1, there is shown a magnetorheological fluid damper of the present invention, indicated generally at 10, designed to provide a smooth transition, without a sharp break in the damper force/velocity curve, between very low damping forces near zero damper piston velocity to higher damping forces at higher damper piston velocities. Damper 10 includes a cylinder 12 containing magnetorheological fluid, a piston assembly 14 mounted for reciprocal movement in cylinder 12, a magnet assembly 16 mounted on piston assembly 14 to generate a magnetic field, and a force/velocity curve optimization feature indicated generally at 18. Force/velocity curve optimization feature 18 effectively creates a continuous, smooth transition between low and high velocity damping forces while permitting dampers to be selectively tuned in a predetermined manner to achieve desired damping effects for a given application.

Piston assembly 14 divides cylinder 12 into a first chamber 20 positioned on one side of piston assembly 14 and a second chamber 22 positioned with the cylinder 12 on an opposite side of piston assembly 14. Piston assembly 14 can include a cylindrical rod 24 and a piston core 26 mounted on one end of rod 24. The piston core 26 is formed of a magnetic material, such as soft steel. Magnet assembly 16 includes a coil 28 mounted on piston core 26. The piston core 26 may be spool shaped to form flux pole pieces 30 positioned on each axial side of coil 28. Coil 28 is connected to an electrical source (not shown) via leads, which may extend through rod 24 for generating an electrical current in the coil. Magnet assembly 16 also includes an annular flux ring 32 containing a central bore for receiving piston assembly 14. As shown in FIG. 1, flux ring 32 is positioned around piston assembly 14 to form an annular flow gap 36 between an inner annular surface 34 of flux ring 32 and an outer surface 35 of piston core 26.

Damper 10 further may include non-magnetic end plates 38 positioned on each axial end of piston core 26 for securing flux ring 32 to piston core 26. Flux ring 32 should be effectively secured against movement relative to piston core 26 so as to precisely form and maintain a desired radial width or thickness of flow gap 36 thereby providing predictable control of the damping effect. Each end plate 38 may include several radial extensions 40 angularly spaced around the circumference of end plate 38 for connection to flux ring 32. The outer diameter of end plates 38 is no greater than the outer diameter of piston core 26, except for the flow areas covered by radial extensions 40, to permit substantially unimpeded flow of magnetorheological fluid through flow gap 36. End plates 38 may be connected to piston core 26 and flux ring 32 by any conventional means, such as threaded fasteners or welding.

Fundamentally, during damping, magnetorheological fluid present in one of the chambers of cylinder 12 flows through flow gap 36 from, for example, first chamber 20 to second chamber 22 as piston assembly 14 moves to the right as shown in FIG. 1. Flux ring 32 is designed with an outer diameter sized to form a sliding fluid seal with the inner surface of cylinder 12 so as to permit relative sliding movement while avoiding significant leakage at the interface. The magnetorheological fluid may be any conventional fluid including magnetic particles such as, for example, iron or iron alloys suspended therein, so as to be controllably varied with respect to its shear flow characteristics by a magnetic field applied across flow gap 36 and thus vary the flow characteristics of the fluid through flow gap 36. The magnetic field is generated by current in coil 28 and is applied to flow gap 36 by a magnetic circuit comprising flux pole pieces 30 of piston core 26 and flux ring 32, in which magnetic flux circuit flow gap 36 is the predominate gap. The electrical current to coil 28 can be varied to vary the magnetic field thereby controlling the flow characteristics of the magnetorheological fluid to achieve a desired damping effect for a given application.

Force/velocity optimization feature 18 can include one or more axial passage, slot or groove 42 formed in one or both of an inner annular surface 34 of flux ring 32 and core 26. Groove 42 may extend along the entire axial length of piston 14 along annular flow gap 36 to permit fluid flow through the groove between first chamber 20 and second chamber 22. In the alternate, the groove 42 may be formed in core 26 adjacent the coil 28 in pole pieces 30 so as to bypass and not interfere with the coil 28, in an interrupted form as is shown in FIG. 6., and described more fully below.

In operation of the damper, with a given electric current in coil 28 and no damper velocity, coil 28 generates a predetermined flux level in flow gap 36 and a decreasing flux gradient in groove 42. The magnetic particles suspended in the fluid are aligned to provide an elevated yield stress to fluid flow through flow gap 36 and a less elevated yield stress in groove 42. An increase in damper velocity from zero speed produces a pressure drop between chambers 20 and 22 that causes an increased shear stress on the fluid within gap 36 and groove 42. As the shear stress increases, the yield stress of the fluid is first surpassed, and the fluid begins to flow, at the surface 41 of groove 42, where the magnetic flux is lowest. As the pressure difference rises, the shear stress increases to provide flow in a region within groove 42 expanding from the surface 41 toward the main flow gap 36. This increasing volume of the column of flowing fluid allows the velocity of the damper to increase, somewhat slowing and smoothing the pressure rise within the damper. When the shear stress nears the yield stress of the flow gap 36, the fluid of region 44 provides a smoothing transition to addition of the fluid in the entire flow gap 36 to the already flowing column of fluid in groove 42. With the great increase in fluid flow volume of the main flow gap 36, the effect of groove 42 is greatly reduced in comparison and the flux level in flow gap 36 essentially controls the operation of the damper. It is important to note that, since the groove 42 is open to the main portion of the flow gap 36, there is a yield stress gradient between the groove and the remainder of the flow gap which coordinates and smoothes the entry of the main portion of the flow gap 36 into the fluid flow. Such coordination would be difficult, if not impossible, to obtain with the use of separate bypass passages. The beneficial effects of groove 42 are provided at low piston velocities, which occur at both ends of each piston stroke, as the piston velocity slows to zero and then increases in the opposite direction. But control is not reduced at higher velocities, since the cross-sectional area of the groove is small compared to the flow gap and the purely hydraulic restriction at the higher velocities becomes equal to the MR effect generated restriction.

Accordingly, the magnetorheological fluid in groove 42 is subject to less magnetic field strength and thus provides less magnetorheological effect. At low velocities, this reduced magnetorheological effect in groove 42 has a significant desirable effect of permitting sufficient flow through groove 42 to smooth the transition to higher forces/velocities. However, at higher velocities, the portion of the fluid in groove 42 experiences a hydraulic restriction equal to the magnetorheological effect in flow gap 36, preventing loss of pressure at high damper velocities and thus maintaining maximum force levels. As described above, groove 42 is sized and shaped such that, at low piston velocities, the amount of fluid in groove 42 affected by the decreased magnetorheological effect significantly affects the total damping of damper 10 as a substantially Newtonian fluid. Specifically, at low damper velocities, fluid in groove 42 experiences a reduced magnetorheological effect less than fluid flowing through annular flow gap 36 thereby creating a modified bypass which desirably decreases the rate of increase in the damping force during damper velocity increase. As the velocity increases or the flux density increases, the hydraulic restriction or the magnetorheological effect, respectively, experienced by the fluid flowing through groove 42 increases to create a greater restriction and thus less of a bypass through the damper. At high velocities the magnetorheological effect on the fluid in groove 42 does not significantly impact the total magnetorheological effect experienced throughout annular flow gap 36. The shape of groove 42 is designed to control the slope and provide for a smooth transition in the force-velocity curve as the damper piston velocity increases from zero to substantial values. Although a single groove 42 is shown, multiple grooves may be provided around the inner circumference of flux ring 32 or the outer surface 35 of piston core 26. Thus, likewise, multiple grooves may be provided in outer annular surface 35.

The present invention contemplates grooves of varying shapes, for example, arcuate, triangular, rectangular, oval, etc., and varying cross-sectional area. Each of these shapes provides the basic benefits of this invention but with a somewhat different specific magnetic flux gradient. Other specific shapes provide obvious variations that are included in the scope of the invention. Referring again to FIG. 1, force-velocity optimization feature 18, including groove 42, of the present invention, advantageously permits an MR damper assembly to be selectively designed to produce the precise force/velocity characteristics desired for a particular application. Specifically, the dimensions and shape of groove 42, and perhaps the number of grooves provided, can be selected to achieve the slope of the force/velocity curve desired. This tunable feature is particularly advantageous in vehicle suspensions used for vehicles operating under different conditions. Thus, the damper designer is provided with a full range of options regarding the desired output damping curve and its characteristics thereby permitting a unique damping profile to be designed for each specific application. In addition, the damper of the present invention effectively avoids the undesirable step load characteristics at the zero crossing point of conventional dampers having no bypass arrangement. In addition, the damper of the present invention avoids the steep rise in the force/velocity curve at low velocities, the sharp transition into the remainder of the damping curve at low velocities, the sharp transition into the remainder of the damping curve and the discontinuities, such as a force overshoot generated by conventional dampers with simple outer bypass slots or passages formed in the damper assembly outside the magnetic field or flux path. Discontinuities are generally disruptive and undesirable in vehicle suspensions due to noise, load transfer and comfort issues. The damper of the present invention allows for the elimination of the discontinuous nature of previous damper designs and permits the force/velocity curve of an MR damper to be tailored to achieve a continuous curve slope transition from low to high velocities. Moreover, conventional dampers having an outer bypass outside the magnetic field, e.g. formed in the outer surface of the flux ring, permit flow through the piston assembly throughout all operating conditions thereby resulting in a pure pressure loss in the system throughout all operating conditions thus disadvantageously lowering the maximum force achievable. The damper of the present invention, however, effectively creates a smooth transition between low and high velocities while maintaining a high force level.

The groove provided in this invention does not need to be axial, or even straight. If the flow gap is provided in a different orientation, the groove will naturally follow the flow gap and assume the same or a similar orientation. For example, the passage through the piston assembly may comprise portions that are essentially axial with a portion that is radial or circumferential that includes the flow gap in which magnetic control is provided. Since the groove must be open to the flow gap in the direction of fluid flow, the groove will also be radial or circumferential as required. In addition, the groove does not necessarily need to extend completely through the piston or the magnetically controlled flow gap. Even a short length of groove will provide some of the beneficial effect of the invention; and in some cases this may be sufficient. As an example, if such a groove were to be used on the inside of annular flow gap 36 in the embodiment of FIG. 1, it could be formed axially in the surface 35 of piston core 26 on an axial side of the coil 28 (shown in FIG. 6). Since the outermost surface of coil 28 is flush with that of surface 35, the groove could not easily be continued across coil 28 without redesign of the coil; and fluid flowing through the groove would thus have to leave the groove and enter the main flow gap 36 as it passed the coil. But the beneficial effect of the invention would be realized to a great degree, particularly since very little magnetic flux crosses the flow gap 36 adjacent the coil and the magnetorheological effect is thus weak in the fluid adjacent the coil and strongest in the fluid adjacent the pole pieces 30, where flow gap 36 would be open to the grooves.

Figure 2:
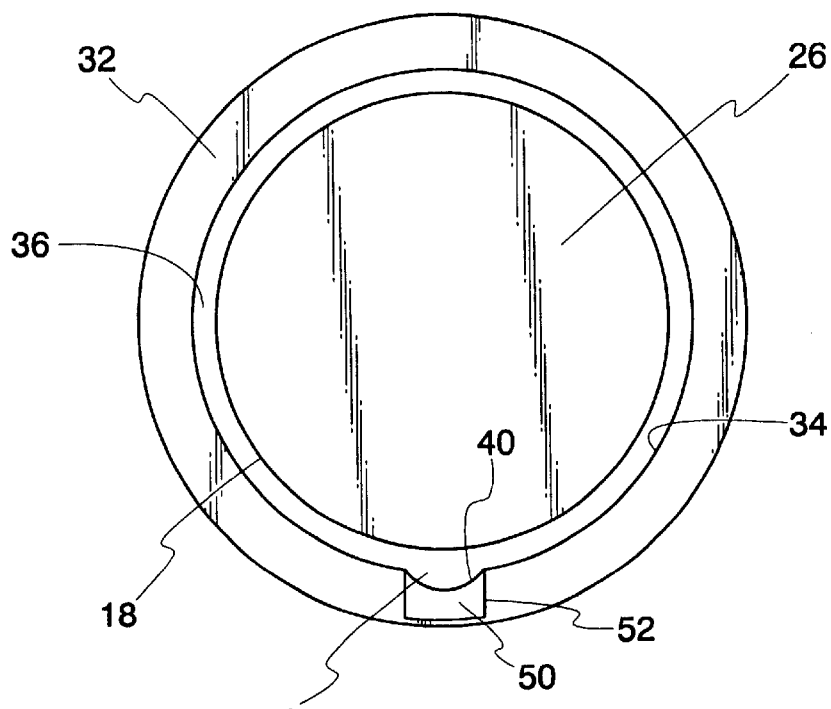
FIG. 2 is a simplified end view of the piston of the damper of FIG. 1 showing the annular flow gap having a groove in the inner surface thereof.
Figure 3:
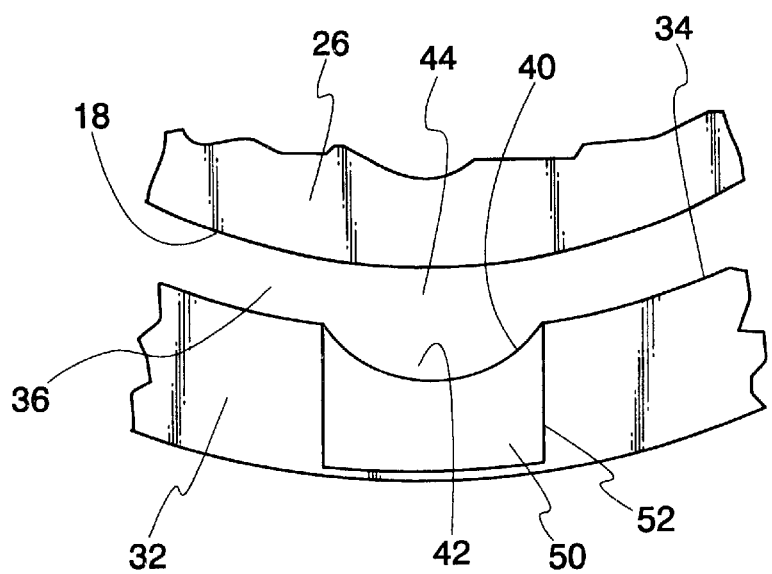
FIG. 3 is an enlarged portion of the view of FIG. 2.

Groove 42 is formed, in the embodiment of FIGS. 2 and 3 by a concave, curvilinear arc formed in the inner radial surface 41 of flux ring 32, which arc creates a larger radial gap width in a small circumferential region 44 of gap 36 and a narrowing of the radial width of the flux ring 32 at the deepest point of the groove. Both the greater gap width and the narrower magnetic flux path through the narrowed flux ring tend to reduce flux density in region 44 as compared with the remainder of the gap at any given coil current level. It should be noted that the groove is formed in an area, portion or feature lined, filled or shielded with a non-magnetic material 50. The non-magnetic material 50 may be any suitable non-magnetic material, for example, a thermoset or thermoplastic material. The non-magnetic material 50 is provided in a slot 52 formed in an axial direction, i.e., essentially parallel to the flow gap 36. The non-magnetic liner or filler partially shields the groove from the magnetic field thus lowering the flux density in the groove 42, below levels that are possible to achieve otherwise. The resulting effect is a lower breakaway force at maximum current levels and lower damping coefficients at low velocities. At the same time, the design does not sacrifice either the ultimate attainable damping force or the controllability of the damping coefficient at low velocities compared to a passage outside the gap 36.

As shown in FIGS. 2 and 3, the slot 52 can be a generally rectangular axial slot, groove or mortise formed in the wall 34 of the flux ring 32. Since the slot is provided in the flux ring 32 of the illustrated embodiment, the slot 52 can extend the entire length of the piston, as shown in FIG. 1 without interfering with the coil 28. The slot 52 can also be triangular, semicircular, oval or other suitable cross-sectional shapes (not shown). Similarly, the groove 42 can be rectangular, triangular, semicircular, oval or other suitable cross-sections (not shown).

Figure 4:
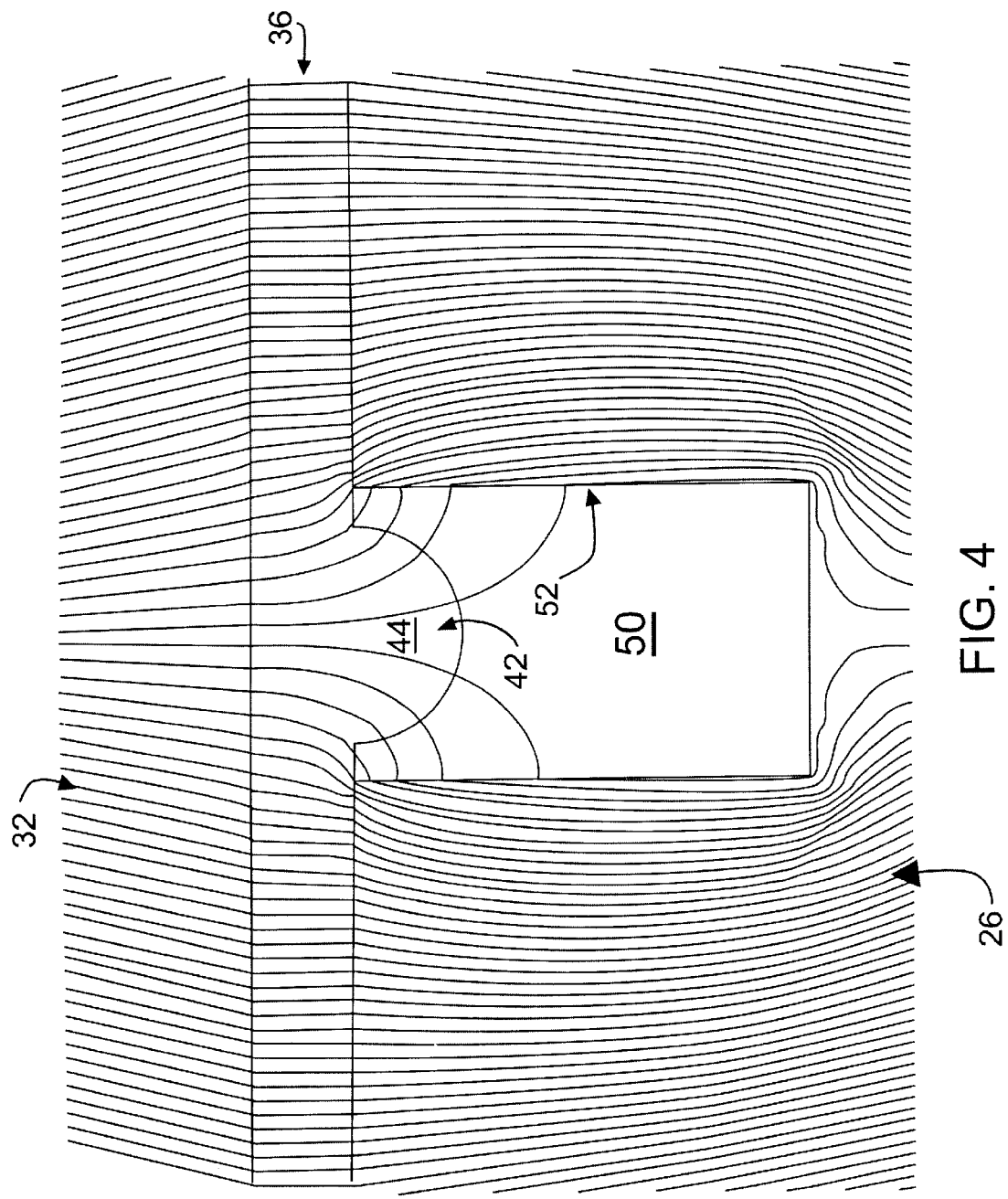
FIG. 4 is an enlarged portion of a simplified view of another embodiment of a piston and flux ring showing an annular flow gap, groove and shield material including a depicted flux pattern of the present invention.

As shown in FIG. 4, the flux density (indicated by the magnetic field lines) of the magnetic field generated across the gap 36 is reduced in the slot 52, through non-magnetic material 50 and in the area of groove 42. In this manner, fluid flow resistance through groove 42 is greatly reduced. FIG. 4 shows flux density depicted as lines across piston core 26, flow gap 36, and groove 42 formed influx ring 32. A flux gradient in region 44 provides flux levels decreasing from its inner border at the outer surface 35 of flux pole pieces 30 to a lower value along the surface of the groove 42 (FIG. 1). With careful design, if desired, this decrease may be close to zero flux at the groove 42. In addition, this gradient is generally not linear. Most of the decrease in flux occurs within the groove 42, with flux levels not decreasing greatly within the main gap 36 itself. The gradient provides a smooth transition between flow gap 36 and groove 42.

It will be understood that the groove 42 and slot 52 can be formed in either the ring 32 or, in the alternate, the piston core 26 (as shown in FIG. 5), in which case it can be provided in a discontinuous or interrupted form. As shown in FIG. 5, a simplified view of core 126 is shown. The core 126 includes slot 152 partially filled with non-magnetic material 150, for example, nylon or epoxy polymeric material. Groove 142 is formed in the non-magnetic material 150 adjacent the outer surface or periphery 154 of the core 126 and open to the gap 136. FIG. 5 illustrates a core 126 with a single slot/filler/groove feature. However, as shown in FIG. 7, a plurality of slot/filler/groove features 152, 150, 142 may be provided to optimize the operation of the damper, which may be arranged around the core 126. In this manner, assembly of the piston may occur with a low likelihood of all the grooves being blocked.

Referring to FIG. 6, which is a cross-sectional view of the core 126 of FIG. 5, it can be seen that the groove 142 is discontinuous, i.e., formed in the core only above and below the coil 128 (142A, 142B). It is believed that since the flux density is low radially with respect to the coil it is not necessary to extend the groove 142 the entire length of the core. Thus, performance is not compromised by having to relocate the coil 128 to adapt the core 126 to the groove 142.

Similarly, referring to FIG. 8, a plurality of discontinuous grooves 142A–D can be formed in the non-magnetic filler material 150 in the core 126 in a spaced apart configuration as shown about coil 128.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A damper, comprising:
   a cylinder containing a magnetorheological fluid;
   a piston slidably mounted for reciprocal movement in the cylinder, wherein the piston includes a core and a flux ring positioned about the core, the core and flux ring defining an annular, axially directed flow gap therebetween; and
   at least one non-magnetic portion positioned along the flow gap in at least one of the flux ring and the core, wherein the non-magnetic portion includes at least one groove formed therein and positioned along at least a portion of the flow gap.

2. The damper of claim 1, further comprising:
   a coil disposed in the piston core, wherein the at least one groove is an interrupted groove formed adjacent the coil.

3. The damper of claim 2 wherein the at least one groove is an interrupted groove formed in the core above and below the coil.

4. The damper of claim 3 wherein the at least one groove is formed in the core pole pieces.

5. The damper of claim 1 wherein the at least one groove is a plurality of axial grooves arranged about one or both of the core and the flux ring.

6. The damper of claim 5 wherein the plurality of grooves are formed on an outer surface of the core.

7. The damper of claim 5 wherein the plurality of grooves are formed on an inner surface of the flux ring.

8. The damper of claim 1 wherein the non-magnetic material is a polymeric material.

9. The damper of claim 1 wherein the non-magnetic portion is disposed in at least one axial slot formed in the flux ring.

10. The damper of claim 1 wherein the non-magnetic portion is disposed in at least one axial slot formed in the core.

11. The damper of claim 1 wherein the at least one groove extends along an entire length of the flux ring and in communication with the flow gap along an entire length of the groove.

12. A method for providing a smooth transition between low and high velocity damping forces in a fluid damper for a vehicle suspension comprising:
   generating a predetermined flux level through a gap formed between a first and second chamber of the damper, wherein the gap comprises an annular, axially directed passage within a piston assembly of the damper; and
   generating a decreased flux level through at least one groove, an entire length of the groove formed in communication with the gap, wherein the groove is formed in a non-magnetic portion of the piston and axially directed along at least a portion of a length of one of an inner wall and an outer wall defining the annular, axially directed passage.

13. A damper for providing a smooth transition between low and high velocity damping forces in a fluid damper for a vehicle suspension comprising:
   means for generating a predetermined flux level through a gap formed between a first and second chamber of the damper, wherein the gap comprises an annular, axially directed passage within a piston assembly of the damper; and
   means for generating a decreased flux level through at least one groove, an entire length of the groove formed in communication with the gap, wherein the groove is formed in a non-magnetic portion of the piston and axially directed along at least a portion of a length of one of an inner wall and an outer wall defining the annular, axially directed passage.

14. A damper, comprising:
   a cylinder containing a magnetorheological fluid; and
   a piston assembly slidably mounted for reciprocal movement in the cylinder to form a first chamber positioned on one side of the piston assembly and a second chamber positioned on an opposite side of the piston assembly, wherein the piston assembly includes a fluid flow passage therethrough defining a flow gap permitting limited fluid flow between the first chamber and the second chamber, wherein the flow gap includes a groove adjacent and open to the flow gap along at least a portion of the flow gap in the direction of fluid flow, the groove being formed in a portion of the piston assembly comprised of a non-magnetic material, the groove being axially directed along one of an inner wall and an outer wall defining the flow gap, the piston assembly further including a magnet assembly establishing a magnetic flux circuit through the flow gap and through the groove in series with a region of the flow gap adjacent the groove, the magnetic flux being established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove and non-magnetic portion of the piston causes the magnetic flux density therethrough to be smoothly reduced from that in the remainder of the flow gap.

15. The damper of claim 14, wherein the magnetic flux circuit comprises magnetic poles defining the flow gap, the flow gap and groove in series providing a greater gap width thereacross between the magnetic poles than the flow gap alone.

16. The damper of claim 14, wherein the groove is formed by a curvilinear surface.

17. The damper of claim 14, wherein the groove has the shape of a polygon.

18. The damper of claim 14, wherein the groove is formed by a triangular surface.

19. The damper of claim 14, wherein the annular, axially directed passage comprises a plurality of grooves formed therealong.

20. The damper of claim 14, wherein the groove is lined with a non-magnetic material adapted to lower the flux density in the groove.

* * * * *